United States Patent [19]
Wu et al.

[11] Patent Number: 6,146,553
[45] Date of Patent: Nov. 14, 2000

[54] NONLINEAR OPTICAL CRYSTAL OF COMPOUND $R_2MB_{10}O_{19}$ AND PRODUCING METHOD AND PRODUCING METHOD AND USES THEREOF

[75] Inventors: Yicheng Wu; Jianguo Liu; Peizhen Fu; Junxin Wang; Guiwen Zhao, all of Hefei, China

[73] Assignee: University of Science and Technology of China, Heifei, China

[21] Appl. No.: 09/301,092

[22] Filed: Apr. 28, 1999

[30] Foreign Application Priority Data

May 14, 1998 [CN] China ........................ 98108570

[51] Int. Cl.[7] .................... G02B 5/20; C01F 17/00; C01B 35/10; G02F 1/35

[52] U.S. Cl. ................ 252/584; 423/263; 423/277; 359/328

[58] Field of Search ................... 423/263, 277; 252/582, 584; 359/328

[56] References Cited

U.S. PATENT DOCUMENTS

| | | |
|---|---|---|
| 3,949,323 | 4/1976 | Bierlein et al. |
| 3,959,006 | 5/1976 | Herrnring ............................ 423/263 |
| 4,422,007 | 12/1983 | Fouassier ............................ 423/277 |
| 4,499,061 | 2/1985 | Glass ................................. 423/277 |
| 4,826,283 | 5/1989 | Chuangtian et al. |
| 5,043,308 | 8/1991 | Luetkens, Jr. ........................ 423/277 |
| 5,523,026 | 6/1996 | Chen et al. ........................... 252/584 |
| 5,684,813 | 11/1997 | Keszler ............................... 359/328 |

FOREIGN PATENT DOCUMENTS

| | | |
|---|---|---|
| 10452892A | 9/1990 | China . |
| 1086552A | 5/1994 | China . |
| 0 362 440 A2 | 10/1988 | European Pat. Off. . |
| 1838457 | 8/1993 | U.S.S.R. . |

*Primary Examiner*—Philip Tucker
*Attorney, Agent, or Firm*—Patterson, Thuente & Skaar, P.A.

[57] ABSTRACT

The present invention provides a compound having the chemical formula of $R_2MB_{10}O_{19}$, wherein R is one or more elements selected from the group consisting of rare-earth elements or Y; M is selected from the group consisting of Ca, Sr, Ba, a single crystal of the compound, a producing method and uses thereof. The compound is congruently melting, which is suitable for producing large size single crystal of $R_2MB_{10}O_{19}$ with melt methods, especially pulling method, at a low cost. The crystal resulted therefrom has the same NLO effect as LBO with superior mechanical properties, and it is antideliquenscent. The crystal of the present invention can be used for the frequency-conversion of blue-green wavelength lasers.

11 Claims, 1 Drawing Sheet

NONLINEAR OPTICAL CRYSTAL OF COMPOUND $R_2MB_{10}O_{19}$ AND PRODUCING METHOD AND PRODUCING METHOD AND USES THEREOF

TECHNICAL FIELD

The present invention relates to a compound with the general formula of $R_2MB_{10}O_{19}$, wherein R is one or more elements selected from the group consisting of Y, La, Ce, Pr, Nd, Pm, Sm, Eu, Gd, Tb, Dy, Ho, Er, Tm, Yb, and Lu; M is selected from the group consisting of Ca, Sr and Ba. The present invention also relates to a nonlinear optical crystal of the compound, a producing method of the crystal, a nonlinear optical (NLO) device and a laser NLO multifunctional device made of the crystal.

BACKGROUND OF THE INVENTION

A crystal having NLO (Nonlinear Optical) effect is called a NLO crystal. For the purpose of present invention, NLO effect means second harmonic generation (SHG) effect, sum-frequency generation (SFG) effect, difference-frequency generation (DFG) effect, parametric amplification (OPA) effect and the like. Only noncentrosymmetric crystal is possible to have NLO effect. NLO devices such as SHG device, up and down conversion device and optical parametric oscillation device, can be manufactured by utilizing the NLO effect of the crystal. A laser beam can be changed by frequency-conversion to result in more lasers within usable wavelength, thereby making a laser apparatus suitable for more usage. A blue-green laser system can be obtained by utilizing the conversion the frequency of the near-infrared laser produced by a solid-state laser apparatus by a NLO crystal, which has a numerous applications in the field of laser technology.

SHG is the most important NLO effect. An electromagnetic wave with a frequency of ω propagating in a NLO crystal will induce a polarization wave of a frequency of 2ω. That is the so-called "SECOND HARMONIC GENERATION". The conversion efficiency of a SHG crystal is proportional to the effective SHG coefficient ($d_{eff}$) square and the input laser power, and is also relative with the phase matching condition. When other conditions are selected, if phase matching is achieved, the conversion efficiency will reach the maximum. Phase matching occurs only for certain crystallographic directions, along which the refractive indices are the same for both the fundamental and the second harmonic waves. For a uniaxial crystal, phase matching relates exclusively to the angle θ which is the angle between the optical axis and the propagation direction of the incoming beam. For a biaxial crystal, phase matching relates to both θ and Φ which are the polar angles of the propagation direction of the incident wave. Phase matching can be achieved in various ways. We usually use the angle tuning method by rotation of the crystal to achieve it.

Currently, NLO materials used for blue-green laser frequency-conversion mainly include KTP ($KTiOPO_4$)(U.S. Pat. No. 3,949,323), BBO (β-$BaB_2O_4$)(China Sciences, B28, 235, 1985), and LBO ($LiB_3O_5$) crystal (Chinese patent application No. 88102084). These materials are defective on crystal growth because KTP and LBO are incongruently melting compounds and BBO undergoes phase changing below melting point. Accordingly, their growth depends on the use of flux method, which results in lower growth rate, higher cost and smaller size.

Development of new NLO materials suitable for being used in the blue-green laser apparatus faces a number of difficulties. Such crystals should be superior in both light transmission and workability. Preferably, the material is a congruently melting compound, so as to possibly grow a single crystal from melt and obtain NLO crystals with great size.

SUMMARY OF THE INVENTION

It is an object of the present invention to provide NLO materials applicable to the blue-green laser system.

There is provided a compound with the following chemical formula: $R_2MB_{10}O_{19}$, Wherein R is one or more elements selected from the group consisting of rare-earth elements and Y; M is Ca, Sr, or Ba.

There is also provided a NLO crystal and a laser NLO multifunctional crystal of the compound of present invention, that belongs to space C2 of monoclinic system, and are therefore biaxial.

It is another object of the present invention to provide a method for producing $R_2MB_{10}O_{19}$ crystals. The crystal can be grown by using melt method or flux method, which comprises the steps of putting the formulated and pretreated raw materials into the crucible, melting the raw materials, growing crystal from the melt surface or from within the melt, and performing post-treatment on crystal; Wherein, the raw material mentioned above contains $R_2O_3$ and MO and $B_2O_3$ in a molar ratio of 0.5–1.5:0.5–1.5:5; The crystal growth rate is 0.01–10 mm/hr, which is controlled by pulling crystal, falling crucible or reducing temperature; Seed crystal may be or may not be used, preferably, seed crystal is used; if seed crystal is used, the seed may be cut along a or b or c axis or other directions, preferably along b axis; The seed and/or crucible may be or may not be rotating, the rotation rate is 0–100 rpm.

It is a further object of the present invention to provide a NLO device, comprising means to direct at least one incident beam of electromagnetic radiation into at least one crystal having NLO properties, whereby electromagnetic radiation emerging from said crystal contains at least one frequency different from that of any incident beam of radiation, wherein said crystal is a single crystal of $R_2MB_{10}O_{19}$.

The present invention further provides a laser NLO multifunctional device, which is placed in an optical resonant cavity, and excited by a pump source to produce a fundamental laser and at least one laser output with a frequency different from the fundamental frequency, characterized in that, the laser NLO multifunction device in the resonant cavity is a $R_2MB_{10}O_{19}$ single crystal containing rare-earth laser activated ions.

DETAILED DESCRIPTION OF THE INVENTION

Figure 1:
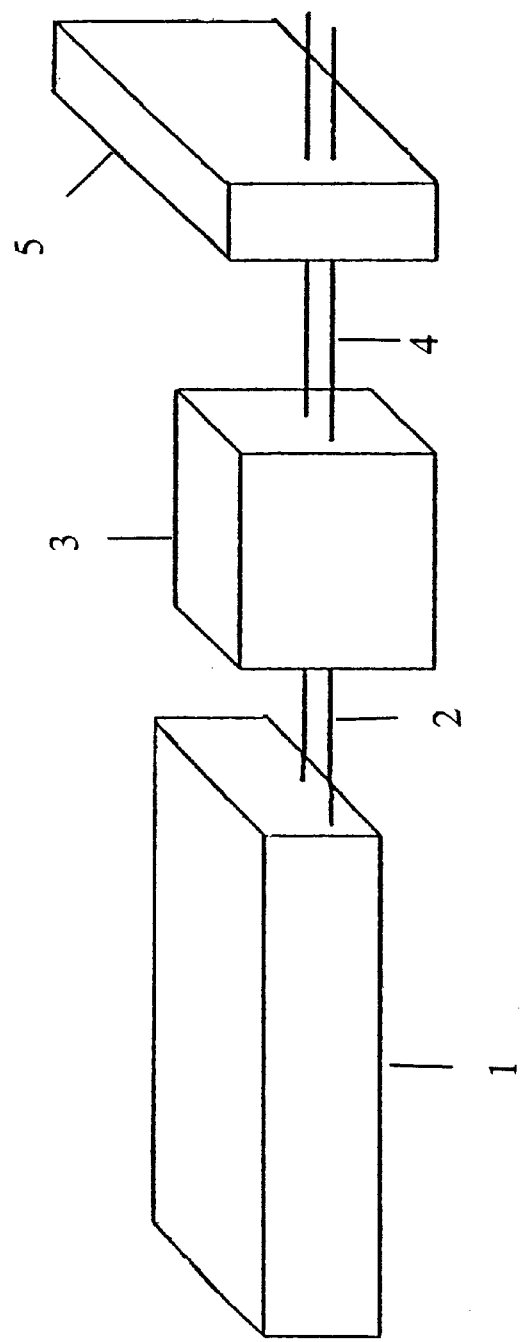
FIG. 1 shows the working process of a typical NLO device produced with $R_2MB_{10}O_{19}$ of the present invention, wherein 1 denotes a laser apparatus, 2 denotes a laser beam, 3 denotes a $R_2MB_{10}O_{19}$ single crystal treated by crystal post-treatment and optical processing, 4 denotes a resultant emerging laser beam, 5 denotes a filter.

There is provided a compound with the chemical formula of $R_2MB_{10}O_{19}$, wherein R is one or more elements selected from the group consisting of rare earth elements and Y; M is Ca, Sr, or Ba, which is a congruently melting compound.

The compound $R_2MB_{10}O_{19}$ can be prepared by the reaction of the oxides or salts, for example chloride, carbonate, nitrate, oxalate, borate and the like, of R and M with $H_3BO_3$ or $B_2O_3$ after the raw materials are mixed homogeneously in a molar ratio of $R_2O_3:MO:B_2O_3=1:1:5$.

Generally, the $R_2MB_{10}O_{19}$ compound can be prepared by any known chemosynthesis reactions with the above mentioned matereial, preferably, the solid-state reaction is used, which comprises mixing the raw materials containing $R_2O_3$, MO and $B_2O_3$ in a molar ratio of 1:1:5 to obtain a homogeneous state, then heating the mixture to allow the solid-state reaction to proceed, and finally the compound having the chemical formula of $R_2MB_{10}O_{19}$ is resulted.

A number of typical chemical reactions for obtaining $R_2MB_{10}O_{19}$ is as follows:

$R_2O_3+MCO_3+H_3BO_3 \rightarrow R_2MB_{10}O_{19}+CO_2\uparrow+H_2O\uparrow$ $R_2O_3+MO+B_2O_3 \rightarrow R_2MB_{10}O_{19}$ $R(NO_3)_3 \cdot nH_2O+MCl_2+H_3BO_3 \rightarrow R_2MB_{10}O_{19}+Cl_2\uparrow+H_2O\uparrow+NO_2\uparrow+O_2\uparrow$ $R_2O_3+M(NO_3)_2+B_2O_3 \rightarrow R_2MB_{10}O_{19}+NO_2\uparrow+O_2\uparrow$ $RB_3O_6+MB_4O_7 \rightarrow R_2MB_{10}O_{19}$ Since R in the compound of $R_2MB_{10}O_{19}$ is one or more elements selected from the group consisting of rare-earth elements, and the 3-valence rare-earth ions have abundant energy levels, a multi-color luminescence can be acquired. Accordingly, they are excellent luminescence materials.

There is also provided a NLO crystal, characterized in that it is derived from the compound with the chemical formula of $R_2MB_{10}O_{19}$, wherein R is one or more elements selected from the group consisting of rare-earth elements and Y; M is selected from the group consisting of Ca, Sr and Ba. The crystal of present invention is noncentrosymmetric, which belongs to space C2 of monoclinic system.

When R is La, M is Ca, the cell parameters of the crystal having a chemical formula of $La_2CaB_{10}O_{19}$ are:

a=11.043(3)Å, b=6.563(2)Å, c=9.129(2)Å, $\alpha=\gamma=90°$, $\beta=91.47°$, Z=2.

When R is at least two elements, of which one is selected from the group consisting of laser activated ions of $Nd^{3+}$, $Pr^{3+}$, $Sm^{3+}$, $Eu^{3+}$, $Dy^{3+}$, $Ho^{3+}$, $Er^{3+}$, $Tm^{3+}$ and $Yb^{3+}$, in other words when a $R_2MB_{10}O_{19}$ crystal comprises laser activated ions, the $R_2MB_{10}O_{19}$ crystal has laser properties, which is a multifunctional crystal of laser and NLO. Typically, the concentration of the laser activated ions is between 0.01–10.0 wt %. If the concentration is zero, no laser is produced. However, much higher concentration may result in concentration luminescence quenching.

The NLO crystal having the chemical formula of $R_2MB_{10}O_{19}$ can be grown from melt by the following method:

(a) Mixing raw materials containing $R_2O_3$ and MO and $B_2O_3$ in a molar ratio of 1:1:5;

(b) heating the mixture to melt in a crucible, and maintaining said melt at a temperature higher than the melting point of $R_2MB_{10}O_{19}$ for about 5–24 hours;

(c) decreasing the temperature of the melt to a temperature a little higher than the melting point of $R_2MB_{10}O_{19}$, and inserting a seed of $R_2MB_{10}O_{19}$ crystal into the crucible from the top, keeping the seed in contact with the melt, then decreasing the temperature to the melting point, rotating the seed or the crucible at a speed in the range of 0–100 rpm including pulling it upward at a speed in the range of 0.01–10 mn/hr;

(d) drawing the crystal out of the melt when it growes to a desired size;

(e) cooling the hot grown crystal to room temperature at a rate less than 100° C. /hr.

Said raw materials may be the oxide, chloride, carbonate, nitrate, oxalate or borate of R and M, and $H_3BO_3$ or $B_2O_3$.

In addition, the crystal may be grown from the melt by the following method, comprising growing the single crystal of $R_2MB_{10}O_{19}$ to a suitable size by setting the pulling rate to zero and the cooling rate at a range of 0–5° C./day under the above-described conditions for growing a crystal with the first method. Seed crystal may or may not be used.

Alternatively, the crystal is grown from the melt by the following method, comprising the steps of moving the crucible downward or moving the heater upward at a rate of 0.01–10 mm/hr, thereby allowing the formation of the single crystal through a temperature gradient. In this process, seed crystal may or may not be used, and the seed is placed at bottom of a crucible if it is used.

This process can also be performed by slowly cooling down the crystal oven. Heating may be carried out by using a wire, or a SiC rod or a $MOSi_2$ rod heater.

The crucible may be in a cylindrical form, a conical bottom form, or other suitable forms.

Also, the crystal may be grown by using flux method, comprising the steps of performing the first above-described method for growing a crystal, except that the molar ratio in the raw materials of $R_2O_3$ and MO and $B_2O_3$ is in the range of 0.5–1.5:0.5–1.5:5; the cooling rate of the melt is in the range of 0–10° C./hr; the pulling rate is zero or 0.01–10 mm/hr, and preferably the pulling rate is zero, thereby allowing the single crystal of $R_2MB_{10}O_{19}$ to grow to a suitable size.

Generally, speaking, conventional melt method and flux method is both suitable for producing the crystal having a chemical formula of $R_2MB_{10}O_{19}$ of the present invention.

Single crystals of $R_2MB_{10}O_{19}$ in the size of centimeters can be produced by using the above-described methods. Single crystals having even greater size can be obtained if a bigger crucible is used.

Post-treatment of the crystal and optical process is performed as follows:

(a) Separating the crystal from the melt surface and maintaining it in the oven to cool down to room temperature at a rate less than 100° C./hr, preferably at the rate of 30–50° C./hr;

(b) Orientating the crystal based on the crystallographic data, and cutting the crystal according to the desired phase matching angles θ and Φ, thickness and area of the section, then polishing the surface of the crystal.

As such, the crystal is ready to be used in a NLO device. The choice of phase matching angles depends on which of the $R_2MB_{10}O_{19}$ family crystals is used. The details of phase matching in a biaxial crystal has been described in *J Appl. Phys.* 38,4365, 1973.

The optical processing for a NLO crystal mentioned above is well known to a person skilled in the art. No special accuracy of the optical processing is required with the crystal of the present invention.

The $R_2MB_{10}O_{19}$ crystal of the present invention can be used in the NLO device. Such a device comprises an apparatus with which at least one incident beam of electromagnetic radiation is directed into at least one NLO crystal to produce at least one output electromagnetic radiation beam with a frequency different from that of the incident electromagnetic radiation, characterized in that said NLO crystal is a single crystal of $R_2MB_{10}O_{19}$.

FIG. 1 illustrates the principle of a typical NLO device made of a single crystal of $R_2MB_{10}O_{19}$. As is shown in the figure, a coherent electromagnetic beam 2 produced by laser 1 is introduced into a $R_2MB_{10}O_{19}$ crystal 3. The resultant emerging beam 4 is then directed into a filter 5, thereby the beam of interest be obtained. The devices made of $R_2MB_{10}O_{19}$ crystal of the present invention can be used as the second harmonic generators, up and down frequency converters, optical parametric oscillators and the like. Laser apparatus 1 can be a Nd:YAG laser or others. As to the SHG using a Nd:YAG laser as the light source, the incident beam 2 is an infrared at a wavelength of 1064 nm, whereas, the departing beam 4 further contains a green second harmonic wave at a wavelength of 532 nm. The infrared wave is removed when beam 4 passes through filter 5.

In a preferred embodiment, a $La_2CaB_{10}O_{19}$ crystal of the present invention can be used in the NLO device. Such a device comprises an apparatus with which at least one incident beam of electromagnetic radiation is directed into at least one NLO crystal to produce at least one output electromagnetic radiation beam with a frequency different from that of the incident electromagnetic radiation, characterized in that said NLO crystal is a single crystal of $La_2CaB_{10}O_{19}$.

The $R_2MB_{10}O_{19}$ crystal containing rare-earth laser activated ions in accordance with the present invention can also be used to manufacture a laser NLO multifunctional device. Said laser NLO multifunctional device is placed in an optical resonant cavity, and excited by a pump source to produce a fundamental laser and at least one output laser with a frequency different from that of the fundamental frequency. The device in the resonant is a $R_2MB_{10}O_{19}$ single crystal containing rare-earth laser activated ions.

In another preferred embodiment of the present invention, said crystal is a $(La_{0.96}Nd_{0.04})_2CaB_{10}O_{19}$ crystal, which may be used as one of the laser NLO multifunctional device of a self frequency-doubling device. Said self frequency-doubling device is placed in an optical resonant cavity consisting of a full-reflecting mirror and an output mirror, and excited by a pump source to produce an infrared laser. Said infrared laser undergoes frequency-conversion effected by the NLO property of the crystal itself, thereby an infrared fundamental laser output as well as a green frequency-doubled harmonic laser output is acquired. Said device is characterized in that the self frequency-doubling device in the optical resonant cavity is a single crystal of $(La_{0.96}Nd_{0.04})_2CaB_{10}O_{19}$.

The present invention provides a compound having the chemical formula of $R_2MB_{10}O_{19}$, a nonlinear optical (NLO) crystal and a laser NLO multifunctional crystal of the compound, and the producing method and uses thereof. Due to the fact that $R_2MB_{10}O_{19}$ is a congruently melting compound suitable for growing a crystal with melt method and conventional melt growing method can be applied, the method of the present invention eliminated the need of a flux, simplified the operation, enhanced the growth rate of the crystal, lowered the cost and making it easier to obtain crystals with greater size. Accordingly it is superior to the conventional method for producing the NLO crystals of KTP, BBO, LBO used in the frequency-conversion of blue-green wavelength. The growing of a LBO crystal normally takes several months, whereas the growing of a $R_2MB_{10}O_{19}$ crystal in accordance with the present invention takes only several days. The crystals thus obtained have the same NLO effect as LBO, with superior mechanical property, infragility, undeliquescentability, workability and preservability. When the NLO crystal of the present invention is processed into a NLO device having a section area of 5×5 mm, and a thickness in the direction along light beams of 7 mm, an incident beam of an infrared radiation at the wavelength of 1064 nm can be converted into a resultant emerging beam of a green laser at the wavelength of 532 nm by using a Nd:YAG laser as the light source at room temperature. The laser power thus produced is the same as that produced by radiating the same size LBO crystal with the same infrared radiation. When a self frequency-doubling laser device manufactured by the laser NLO multifunctional device in accordance with the present invention is placed in an optical resonant cavity comprised of a high-reflecting mirror and an output mirror, and is excited by a pump source, the crystal produces a infrared laser which in turn undergoes frequency-conversion, which is effected by the NLO effect of the crystal itself. By this way, an infrared fundamental laser output as well as a green frequency-doubled laser output are obtained.

The present will be illustrated in detailed with following Examples. All the compounds described in the examples possess substantial NLO properties and are phase matchable as tested by the Kurtz powder method (S. C. Abraham, S. K. Kurtz and P. B. Jamieson, *Phys. Rev.*, 172, 551[1968]).

EXAMPLE 1

A Pt crucible with the size of 50 mm in diameter and 35 mm in height was charged with a homogeneous mixture of 81.45 g $La_2O_3$, 25.02 g $CaCO_3$ and 154.58 g $H_3BO_3$, and then was placed in a furnace. The charged mixture is sintered at 950° C. for 48 hours. The product was ground to obtain a powder of $La_2CaB_{10}O_{19}$ compound which has a congruent melting point of about 1067° C. measured by the differential thermal curve.

Substitute $La_2O_3$ with other rare-earth oxides or $Y_2O_3$ and substitute $CaCO_3$ with $SrCO_3$ or $BaCO_3$, and perform the method described above, respective $R_2MB_{10}O_{19}$ compound were obtained.

EXAMPLE 2

A Pt crucible with the size of 40 mm in diameter and 40 mm in height was charged with a homogeneous mixture of 52.13 g $La_2O_3$, 2.243 g $Nd_2O_3$, 16.68 g $CaCO_3$ and 58.02 g $B_2O_3$. The mixture is sintered at 980° C. for 40 hours. The product was ground to obtain a powder of $(La_{0.96}Nd_{0.04})_2CaB_{10}O_{19}$ compound, which has a luminiferous property.

EXAMPLE 3

A Pt crucible with the size of 50 mm in diameter and 35 mm in height is charged with a homogeneous mixture of 81.45 g $La_2O_3$, 25.02 g $CaCO_3$ and 154.58 g $H_3BO_3$, and then is placed in a vertical furnace. The furnace was then sealed with a cover made of thermal insulation material with an opening at the center of the cover to allow the entering of the seed. The furnace was heated rapidly to 1150° C., and maintained at this temperature for 12 hours and then cooled to 1068° C. A seed crystal of $La_2CaB_{10}O_{19}$ cut along b axis and tied to a shaft with a Pt wire was inserted into the melt. The temperature was decreased to 1067° C. The seed was rotated at a rate of 15 rpm and pulled upward at a rate of 0.5 mm/hr. When the growth of the single crystal was almost completed, the pulling speed of the crystal was increased to make it just out of the surface of the melt, and then cool down to room temperature at a rate of 50° C./hr. It takes 4 days to complete the growth of the crystal. The single crystal of $La_2CaB_{10}O_{19}$ thus obtained is of the size of 20 mm in diameter and 25 mm in height.

A variety of single crystals of $R_2MB_{10}O_{19}$ were obtained by using the method described above through substituting $La_2O_3$ with other rare-earth oxides or $Y_2O_3$ and substituting $CaCO_3$ with $SrCO_3$ or $BaCO_3$.

EXAMPLE 4

A Pt crucible with the size of 40 mm in diameter and 40 mm in height was charged with the compound of $(La_{0.96}Nd_{0.04})_2CaB_{10}O_{19}$ obtained in example 2, and then is placed in a vertical furnace. The furnace was then sealed with a cover made of thermal insulation material with an opening at center of the cover to allow the entering of the seed. The furnace is heated rapidly to 1100° C., and maintained at this temperature for 20 hours and then cooled rapidly to 1067° C. A seed crystal of $(La_{0.96}Nd_{0.04})_2CaB_{10}O_{19}$ cut along b axis and tied to a shaft with a Pt wire was inserted into the melt. The rotation rate of the seed is 30 rpm. The temperature is lowered at a rate of 0.4° C. /day. The growth of the crystal was completed 7 days later, and the crystal is pulled up to be separated from the surface of the melt. Then the crystal was cooled down to room temperature at a rate of 40° C./hr to result in a single crystal of$(La_{0.96}Nd_{0.04})_2CaB_{10}O_{19}$ with the size of 25×15×10 mm.

A variety of single crystals of $R_2MB_{10}O_{19}$ were obtained by using the method described above through substituting $La_2O_3$ and $Nd_2O_3$ with other rare-earth oxides or $Y_2O_3$ and substituting $CaCO_3$ with $SrCO_3$ or $BaCO_3$.

EXAMPLE 5

A Pt crucible having a conical bottom with the size of 10 mm in diameter was charged with a homogeneous mixture of 30.21 g $Gd_2O_3$, 13.67 g $Ca(NO_3)_2$ and 29.01 g $B_2O_3$. A seed crystal is placed at the bottom of the crucible. Then the crucible is placed in a vertical furnace. The furnace is heated to completely melt the raw materials. While the heating power is maintained, the crucible is lowered at a rate of 1 mm/hr, allowing the solidification of the melt from bottom to top, thereby giving forth of a single crystal. Then the crystal is cooled down to room temperature at a rate of 30° C./hr to result in a single crystal of $Gd_2CaB_{10}O_{19}$ with the size of 10 mm in diameter and 30 mm in height.

A variety of single crystals of $R_2MB_{10}O_{19}$ were obtained by using the method described above through substituting $Gd_2O_3$ with other rare-earth oxides or $Y_2O_3$ and substituting $Ca(NO_3)_2$ with $Sr(NO_3)_2$ or $Ba(NO_3)_2$.

EXAMPLE 6

A Pt crucible with the size of 50 mm in diameter and 35 mm in height was charged with a homogeneous mixture of 35.47 g $LaB_3O_6$ and 48.58 g $SrB_4O_7$, and then was placed in a vertical furnace. The opening at the top of the furnace is sealed with a thermal insulating material. The furnace is heated rapidly to 1170° C., and maintained at this temperature for 20 hours and then cooled to 1100° C. rapidly. After that, it was cooled to 500° C. at the rate of 3° C./hr and then cool down to room temperature at the rate of 50° C./hr to result in a single crystal of $La_2SrB_{10}O_{19}$ with a size of millimeters.

EXAMPLE 7

A Pt crucible with the size of 50 mm in diameter and 35 mm in height was charged with a homogeneous mixture of 60.96 g $Tb_2O_3$, 32.88$BaCO_3$ and 58.02 g $B_2O_3$, and then is placed in a vertical furnace. The opening at the top of the furnace is sealed with a thermal insulating material. The furnace is heated rapidly to 1200° C., and maintained at this temperature for 10 hours and then cooled to 1100° C. rapidly. After that, it was cooled to 400° C. at the rate of 5° C./hr and then cooled down to room temperature at the rate of 60° C./hr to result in a single crystal of $Tb_2BaB_{10}O_{19}$ with the size of millimeters.

A variety of single crystals of $R_2MB_{10}O_{19}$ were obtained by using the method described above through substituting $Tb_2O_3$ with other rare-earth oxides or $Y_2O_3$ and substituting $BaCO_3$ with $SrCO_3$ or $CaCO_3$.

EXAMPLE 8

The transmission spectra of the $La_2CaB_{10}O_{19}$ obtained in example 3 was measured, the result shows that it is transparent at the wavelength from 240 nm to 3000 nm. The Hardness of it was also measured, which shows that the hardness is 6.5 Mohs. It is ingrigible, antideliquescent, and it is easy to be cut, to be polished and to be preserved. Said crystal was processed into a SHG device having a sectional area of 5×5 mm, a thickness in the direction along the light beams passing through of 7 mm. It was then place at position 3, as illustrated in FIG. 1. By using a Q-modulation Nd:YAG laser as the light source and an infrared radiation at the wavelength of 1064 nm as an incident beam, a green laser at the wavelength of 532 nm was produced as a resultant emerging beam, which has the same laser power as the green laser produced by radiating the same size LBO crystal with the same infrared radiation.

EXAMPLE 9

The crystal of $(La_{0.96}Nd_{0.04})_2CaB_{10}O_{19}$ obtained in example 4 was processed into a self frequency-doubling device having a sectional area of 4×4 mm$^2$, a thickness of 6 mm in the direction along the light beams passing through. The device was placed in an optical resonant cavity composed of an high-reflection mirror and an output mirror, and was excited by a pump source of a mini Xe flashlight to produce an infrared laser as well as a green self frequency-doubling laser output.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

We claim:

1. A compound having the formula of $R_2MB_{10}O_{19}$, wherein R is one or more elements selected from the group consisting of rare-earth elements and Y; M is an element selected from the group consisting of Ca, Sr and Ba.

2. The compound of claim 1, wherein R is at least two elements.

3. A process for producing the compound of claim 1, comprising the steps of mixing the raw materials containing $R_2O_3$ and MO and $B_2O_3$ in a molar ratio of 1:1:5, and allowing the chemosynthesis reaction to proceed, wherein, the raw materials is the oxide, carbonate, nitrate, oxalate or borate of R and M, and $H_3BO_3$ or $B_2O_3$.

4. A crystal, which is produced with the compound having a chemical formula of $R_2MB_{10}O_{19}$, wherein R is one or more elements selected from the group consisting of rare-earth elements and Y; M is Ca, Sr, or Ba; and which is noncentrosymmetric, belonging to space C2 of monoclinic system.

5. The crystal of claim 4, wherein said crystal has NLO effect.

6. The crystal of claim 4, wherein, R is at least two elements, of which one is selected from laser activated ions including $Nd^{3+}$, $Pr^{3+}$, $Sm^{3+}$, $Eu^{3+}$, $Dy^{3+}$, $Ho^{3+}$, $Er^{3+}$, $Tm^{3+}$ and $Yb^{3+}$.

7. The crystal of claim 6, wherein said crystal has laser and NLO multifunction.

8. A process for producing the crystal of any one of claims 4 to 7, said process comprising the steps of:
- (a) Mixing raw materials containing $R_2O_3$ and MO and $B_2O_3$ in a molar ratio of 0.5–1.5:0.5–1.5:5;
- (b) Heating the mixture to melt in a crucible, and maintaining said melt at a temperature higher than the melting point of $R_2MB_{10}O_{19}$ for about 5–24 hours;
- (c) Decreasing the temperature of the melt to a temperature of little higher than the melting point of $R_2MB_{10}O_{19}$, and inserting a seed of $R_2MB_{10}O_{19}$ crystal into the crucible from the top, keeping the seed in contact with the melt, then decreasing the temperature to the melting point, rotating the seed or the crucible at a speed in the range of 0–100 rpm including pulling it upward at a speed in the range of 0–10 mm/hr, and cooling the melt at a rate in the range of 0–10° C./hr during the crystal growth;
- (d) drawing the crystal out of the melt when it grows to a desired size;
- (e) cooling the hot grown crystal to room temperature at a rate less than 100° C./hr;
  said raw materials may be the oxide, carbonate, nitrate, oxalate or borate of R and M, and $H_3BO_3$ or $B_2O_3$.

9. A process according to claim 8, wherein $R_2O_3$ and MO and $B_2O_3$ contained in said materials is in a molar ratio of 1:1:5; the cooling rate of the melt being in the range of 0–5° C./day during the crystal growth.

10. A process for the manufacturing of NLO devices, which contain means to direct at least one incident beam of electromagnetic radiation into at least one said MLO crystal to produce at least one output electromagnetic radiation beam with a frequency different from that of the incident electromagnetic radiation comprising administering a crystal, which is produced with the compound having a chemical formula of $R_2MB_{10}O_{19}$, wherein R is one or more elements selected from the group consisting of rare-earth elements and Y; M is Ca, Sr, or Ba; and which is noncentrosymmetric, belonging to space C2 of monoclinic system into a NLO device.

11. A method of using a crystal, which is produced with the compound having a chemical formula of $R_2MB_{10}O_{19}$, wherein R is one or more elements selected from the group consisting of rare-earth elements and Y; M is Ca, Sr, or Ba; and which is noncentrosymmetric, belonging to space C2 of monoclinic system in Laser NLO multifunctional devices comprising, placing said crystal in an optical resonant cavity, and exciting said crystal by a pump source to produce a fundamental laser and at least one laser output with a frequency different from the fundamental frequency.

* * * * *